3,781,213
METHOD FOR THE PREPARATION OF HOMOGENEOUS METERABLE PASTES AND SUSPENSIONS OF PHTHALIC ACIDS AND GLYCOLS, FOR FEEDING PLANTS, MORE PARTICULARLY CONTINUOUS ESTERIFICATION PLANTS
Francesco Siclari, Barlassina, and Franco Magnoni and Battista Morandi, Milan, Italy, assignors to Snia Viscosa Societá Nationale Industria Applicazoni Viscosa S.p.A., Milan, Italy
Filed Oct. 20, 1971, Ser. No. 190,912
Claims priority, application Italy, Oct. 21, 1970, 7,223/70
Int. Cl. C09k 3/00
U.S. Cl. 252—188.3          10 Claims

ABSTRACT OF THE DISCLOSURE

A method and an apparatus are disclosed for preparing phthalic acid-glycol mixtures for esterification. A problem which is frequently encountered in preparing such paste is the retention of the homogeneousness of their composition, especially in continuous esterification installations. Contrary to widely accepted and well established technical views, it has been discovered that, by keeping the mixtures or pastes at a comparatively low temperature, the preferred range being between 35° C. and 20° C., the problem indicated above, and others connected therewith, are happily solved and the undesirable formation of lumps and incrustations is effectively prevented.

---

Figure 1:
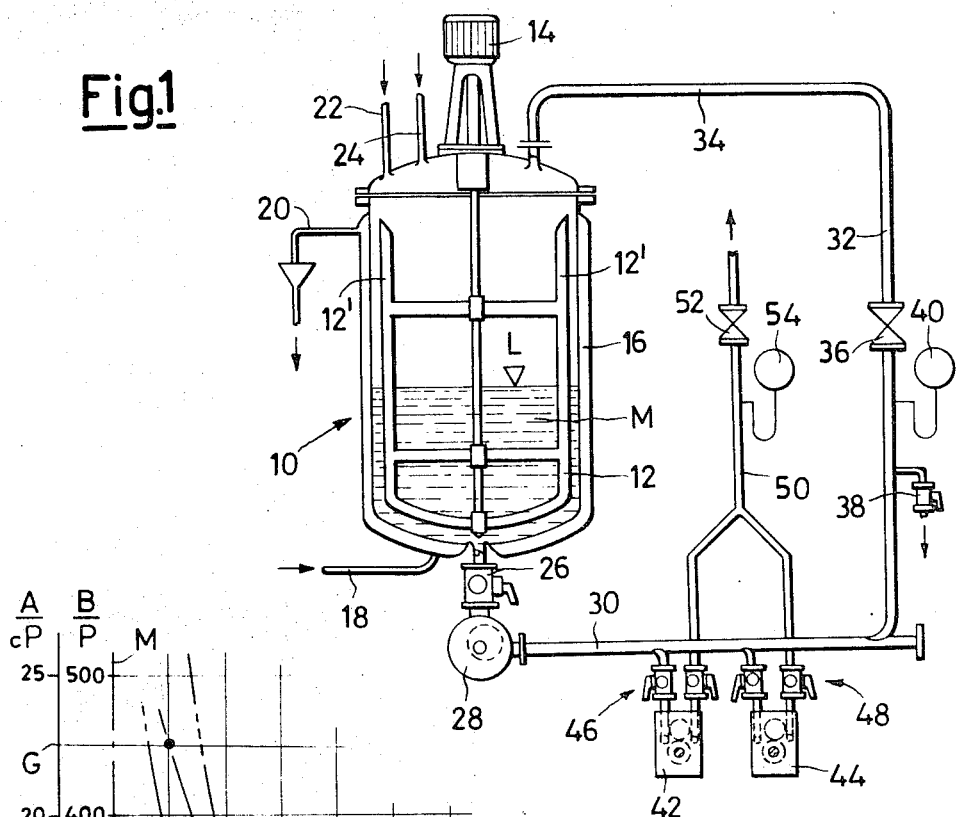

This invention relates to a method and the means and devices for carrying it into practice, for the preparation of mixtures, in a substantially doughy condition, or highly concentrated suspension, of solid particles, said mixtures consisting of phthalic acid in a liquid medium consisting of a glycol, for feeding, either in a continuous flow, or batchwise, esterification plants intended for the production of polyesters.

This invention will be described hereinafter with particular reference to the preparation of essentially homogeneous mixtures, whose fluidity is adequate to permitting the metered feeding of esterification plants, of terephthalic acid (commonly indicated, in the appertaining art, and indicate in the following by the symbol "TPA"), in ethylene glycol, for the preparation of terephthalic polyesters (ethylene polyterephthalate), it being understood, however, that the subject method and apparatus are not rigorously confined to the preparation of pastes consisting of the above named ingredients, inasmuch as the invention is extended to the preparation of pastes for equivalent uses, in which the solid phase is a phthalic acid (ortho-, meta-, and para-isomers) in a crystalline or microgranular state, possibly triturated or anyhow treated to obtain any desired grit size, whereas the liquid phase consists of a glycol (ethylene glycol, propylene glycol etc.), as merely indicated by the term "glycol" as the present description proceeds.

As is well known to those skilled in the art, in order to feed the installations referred to above, a paste or mixture should be prepared, according to preselected ratios, with ethylene glycol and TPA. This mixture must, or desirably should, fulfill a number of prerequisites, such as such a degree of fluidity or flowability as to permit its being fed and forwarded through metering pumps, pipings and the like, a preselected and constant ratio between the components of the paste, and more precisely, between the solid (TPA) and the liquid (glycol) phase of the suspension, and the homogeneousness and constancy of such a ratio in any portion of the admixed material fed to the installation. The latter requirement acquires an outstanding importance in the case of continuously operated installations, the obvious reason therefor being the fact that even the slightest fraction of a suspension, as fed at every instant to the reactor, should contain its components in the desired and preselected ratio.

An example of installations which require that the above enumerated requirements, and others, be abide by, is disclosed in the preceding U.S. patent application No. 813,628, new U.S. Pat. No. 3,644,294, according to which an installation for the continuous-run production of polyesters comprises, as the initial apparatus in the sequence of the several treatment devices, a mixing device for the preparation of the mixture and of the materials to be fed (terephthalic acid, glycol, dimethylterephthalate, and possibly also appropriate additives and catalysts), a metering pump being installed at the outlet of the mixing device. These requirements for homogeneousness and particular physical conditions of the paste, moreover, are particularly desirable whenever, for carrying out esterification and pre-polymerization apparatus are used, in which the admixture of the reactants is prepared and treated in the form of an oozing liquid film, such as described, for example, in another U.S. patent application No. 813,914. Obviously, the method and the means which are the subject of the present invention are not limited, as to their practical use, to feeding installations as disclosed in said previous patents, these being cited only as examples of the technical art concerned.

The molar ratio between the solid and the liquid phases of the mixture (assuming for the sake of simplicity and without thereby introducing any appreciable errors or alterations of what will be disclosed hereinafter, that the mixture comprises only TPA and glycol) is, in turn, a parameter requiring additional considerations to the ends of the present invention. According to the accepted art, these mixtures or pastes are prepared with molar ratios in the order of 2 to 1, or slightly less, between glycol and TPA. In such a mixture, the glycol is in excess with respect to the final composition of the polymer.

Obviously, the excess glycol, which is set free and withdrawn from the reactor(s) of the production plant, is recovered and, upon being condensed and purified, is recycled in order to be reused. From a merely technical standpoint, this causes no trouble at all, inasmuch as the technical art is capable of carrying out the recovery of the excess glycol under the most desirable conditions. On the other hand, this is a considerable burden in the overall installation budget on account of the presence of an intricate recovery system and the operation of the attendant apparatus.

Another fact which should be taken into account for a better understanding of a few aspects of the present invention, is that terephthalic acid (which is a solid, melting at 300° C. approx. with decomposition) is virtually insoluble in the liquid glycol, and that these two compounds, in practice, do not react with one another (so that their admixture is chemically stable, in practice) even at comparatively high temperatures, such as in the range from 100° C. to 150° C. Thus, the fact that such a mixture becomes heated, or be even purposely heated during its preparation, is not a drawback, at least according to the current ideas, but, contrarywise, this fact is regarded as an asset, both because a temperature increase should entail an improved fluidization of the mixture, and because a lesser heat absorption is required in the reactor in which the esterification process should be carried out under pressure, at temperatures comprised between 240° C. and 300° C. approximately. It is thus logical to consider as an advantageous circumstance the fact of feeding the reactants to the reactor, already at comparatively high temperatures. As a matter of fact, preheating of the phthalic acids and glycols is provided and suggested by the pertaining patent literature. As an example, the Italian Pat. 747,297 can be cited.

As is well known, a problem which occurs in the preparation and feeding of these TPA/glycol mixtures, especially when the molar ratios glycol/TPA are lower than 2 to 1, and, above all, lower than 1.7 to 1, is that the mixture exhibits a rapid tendency towards losing its evenness and forming lumps and also solid incrustations. The fact that such a mixture is considerably uneven and has lumps, is not a serious shortcoming in the case of the feeding of batchwise-operated installations, in which the esterification run takes place comparatively slowly. As a matter of fact, even if in the reactant mass lumps are present, which are localized concentrations of TPA, the overall molar ratio in the reactant mass remains unaltered, although the unevenness of the mixture still remains an undesirable factor to be prevented. Such a condition, obviously, is unacceptable or, at any rate, is greatly prejudicial in the case of continuous-feed processes, that is, in those cases in which it is desirable that the molar ratio remains constant in every portion of the continuously fed mixture. On the other hand, the modern metering and/or feeding pumps are capable of working satisfactorily even with very thick pastes, that is, pastes having an apparent viscosity in the order of 1,000 poises and over, provided that the mixtures are homogeneous and not prone to incrustation build-up.

This lump and incrustation build-up, which, inter alia, could be conducive to clogging and even stoppage in the feeding flow, has not been studied and considered with the attention it deserves, as far as it would appear hitherto. Lumps and incrustations are obviously a result whenever solid TPA particles come into mutual contact. Such an undesirable phenomenon is aggravated when very fine-grit or uneven-grit TPA is used, in the presence of a predominant fraction of extremely minute granules, a fact which, per se, is a desirable circumstance to the ends of the reaction, inasmuch as the surface-to-mass ratio of a solid being the higher, the finer the grit-size is. Even though the basic considerations are of an empirical nature, the tendency towards lump formation is counteracted, at present, by keeping at a high level the proportional amount of the liquid phase, i.e. the glycol, in the mixture. These considerations, doubtlessly, are one of the reasons why the current technology adopts rather high glycol/TPA ratios, both in the preparation and feeding of these mixtures, in installations equipped with appropriate recovery and recycling apparatus for the excess glycol, and which absorb considerable amounts of heat for bringing the mass containing said glycol excess to the temperature which is adapted for carrying out esterification.

It has been surprisingly ascertained by the applicants that, by maintaining the TPA mixture or paste in glycol at a comparatively low temperature, not in excess of 50° C., and preferably in the temperature range of from 35° C. to 20° C., but without going below 10° C.–15° C. (a range which, inter alia, could be reached only by employing bulky and costly cooling implementations), the homogeneous character of the paste or mixture is virtually ensured and the undesirable lump and incrustation build-up is practically prevented: obviously, such an unpredicted thermal condition should be allowed for by using rational means both for the mixing and the feeding steps.

It is apparent that the concept of keeping in the cold and even of purposely cooling the paste (to dissipate the heat as generated by the mechanical mixing action, which is both intensive and reiterative), is in sharp conflict with the current technical ideas. As a matter of fact, a low or comparatively low temperature is associated with at least two seemingly undesirable conditions (these are, under other respects, actually undesirable indeed), that is an increase of the viscosity of the doughy mass, which would enhance the pumping, metering and feeding difficulties, and the fact that the reactor should be supplied with heat in an amount which is adequate to heating the reactants, now being fed at temperatures which are lower than that required for the esterification reaction.

According to another surprising discovery by the present applicants, these seemingly detrimental aspects in the preparation and metering of the pastes at comparatively low temperatures, are largely and advantageously balanced by the advantages afforded by the rigorous homogeneousness, both in terms of overall evenness and local uniformity, of the molar ratios of the fed-in reactants, and by the absence of frequently occurring defects (possibly conductive even to a production halt) due to the formation of lumps or even of incrustations which can be removed only with difficulty. These advantages are embodied by a more favourable and regular performance of the esterification and initial polycondensation runs, especially in continuously operating installations.

By operating on quite unique principles in the preparation of the doughy mixture at a comparatively low temperature, the applicants have also ascertained, something which is both surprising and in contrast with the currently accepted technical views. It has been ascertained, in fact, that, under the characteristic conditions of the present invention, homogeneous pastes can be prepared and fed even at molar ratios of the liquid to solid phases (glycol to TPA) which are much below the ones practicable as present, or at least so considered to be, and which can go down to values in the order of 1.1 to one.

By thus adopting molar ratios which are well below those currently adopted by the technical art, other outstandingly advantageous result can be achieved. Above all, the excess glycol to be recovered, purified and recycled is reduced (theoretically to nil), and the reactant mass which is fed in total is also reduced, with a conspicuous advantage from the standpoint of the thermal balance of the production, since it is apparent that the heat absorbed for heating the excess glycol to the reaction temperature, is dissipated without any profit in the subsequent condensation process for said excess glycol, which is withdrawn from the esterification and/or pre-polycondensation reactor.

The applicants suggest, as a hypothesis for justifying such surprising discoveries, and in the limits of probability, the fact that the formation of lumps and incrustations, which is lamented when the current technology is adopted, and which is empyrically offset by keeping the quantity of liquid phase present in the mixture high, is originated by a sedimentation phenomenon, or at least a phenomenon of mobility of the solid particles within the liquid phase, said mobility being, substantially, an inverse function of the viscosity of the liquid (glycol) and the paste, considered as a whole.

By studying the phenomena connected with the invention, it can thus be understood that the seemingly advantageous raising of the temperature of the doughy mixture, which is conducive to a decerase of the viscosity of the glycol and the paste as a whole, should be regarded, in the actual practice, as a negative factor. As a matter of fact, the more viscous the liquid mass is, so much the sedimentation phenomena are slowed down, if not prevented at all. Stated another way, by increasing the viscosity with cooling and purposely, the doughy mixture, which is actually a thick suspension or dispersion of solid particles in a liquid, is physically stabler and retains its homogeneousness and the physical, inter-particle separation. Furthermore, on account of the viscous resistance forces which counteract the gravity pull, or other forces which tend to cause the solid phase to settle, the physical stability of the paste is the greater, the finer is the grit size of the solid phase, the result being an advantage for the subsequent reaction processes, as contrasted with the seemingly detrimental aspect of the problem, according to which the finer is the grit size, the more viscous is the paste, for the same ratio between its liquid and solid phases.

These variations of the viscosity are significant. Anticipating that which will be disclosed in more detail hereinafter with reference to the accompanying drawings and plots, the fact can be recalled that the viscosity of the glycol, as expressed in poises, is roughly halved per each temperature increase of 20° C., approximately, in the range between 20° C. and 80° C., that is in the field of interest for the invention.

Figure 2:
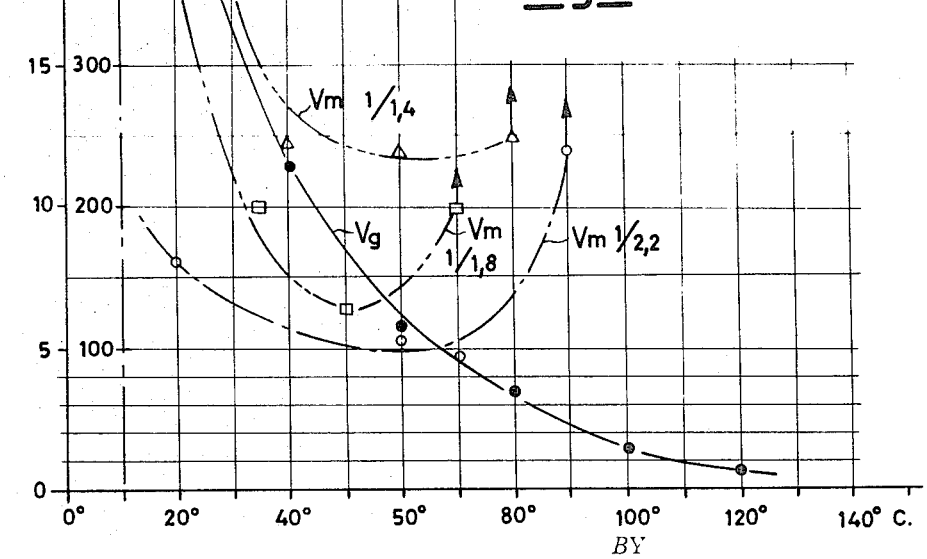

The preparation and the metered feed of the doughy mixture considered herein, by operating under the conditions of comparatively low temperatures which are a feature of the invention, and more particularly with respect to the feeding of continuously operated installations, obviously require the adoption of rational means and appropriate expedients, which will be described by way of example only, with reference to the accompanying drawing, wherein:

FIG. 1 diagrammatically shows, in vertical cross-sectional view a preferred, but not exclusive, example of a mixing assembly which is adapted to prepare and to feed in metered amounts and continuously, the homogeneous paste of terephthalic acid in ethylene glycol, and FIG. 2 is a plot, with different reference scales, which institutes a comparison between the viscosities of the ethylene glycol and the paste, as a function of the temperature.

Obviously, for obtaining a homogeneous paste, irrespective of the considerations set forth above, preselected physical and mechanical conditions should be abided by, which are such as to minimize any cause of troubles, swirling movements and others in the movements of the paste. Thus, in a device to be described hereinafter with reference to FIG. 1, or an equivalent thereof, ducts and passageways are adopted, whose deflections whenever they cannot be dispensed with, exhibit wide radii of curvature, the radiussing spots having no sharp corners, steps and the like, and in which the valve means are of the spherical type or, anyhow, such as to ensure the maximum possible smoothness and continuity in the cross-sectional shapes and directions of the passageways. Such conditions involve technical approaches which, on bearing in mind the necessities indicated above, can be arrived at by exploiting the current technology rules, so that the several structural details will not be described in close detail hereinafter.

As a general rule, the mixer comprises a recptacle or container 10, having a capacity which is proportional to the output of the installation, and in which the mixture M which is being processed mechanically, is maintained up to an appropriate level L and subjected to continuous stirring by means of a stirrer, 12, preferably of the vertical mixing blade type, whose mixing arms 12' extend upwardly through virtually the entire height of the container, so as to prevent the formation of deposits and incrustations on the container walls, also above the level L. The agitator 12 is driven in any conventional manner, such as a motor 14. The characteristic thermal condition of the mixture is ensured by circulation of a coolant fluid, more particularly water, through a jacket 16 which is connected to appropriate inlet ducts 18, and outlet ducts 20 for the heat-absorbing liquid medium.

At the top of the vessel 10 there are the inlets, diagrammatically shown at 22 and 24, for ethylene glycol and terephthalic acid, respectively, both inlets being associated to appropriate pumps, conveying screws, or other means of metered feed (not shown). On the bottom of the same container, there is provided the outlet port, having a valve 26, which preferably is of the ball type: at the outlet side of the valve a recycling pump 28 is connected, which preferably but not compulsorily a cycloidal gear pump giving a high rate of flow, such as a Viking type pump, whose delivery side is connected to a recycling circuitry whose branches 30, 32 and 34 feed the recycled mixture to the top of the container again. Along the recycling circuitry, an appropriate valve device 36 is placed, as well as a device 38 for sampling the mixture, and suitable means, such as 40, for checking the pressure.

The recycling means have also proven to be capable of effecting a thorough mulling of the crystallized acid.

To the starting branch of the recycling loop, the mechanical means for metered feed under pressure are connected, for the polyester producing installation. Preferably, these means comprise gear pumps 42 and 44, operated in parallel, and equipped with couples of inlet and outlet valves, 46 and 48, respectively, which also are preferably of the ball type, and the delivery very sides of the pumps are connected to a duct 50, having a valve 52 and measuring instruments 54, the duct extending up to the first esterification reactor of the installation.

The operation of an assembly for preparing the terephthalic acid-ethylene glycol paste ensures that the thermal conditions which are a basic feature of the invention be maintained.

In practice, the admixture or, to be more precise, the homogenization of the mixture, is predominantly carried out by the recycling pump 28, a gear pump, whose maximum rate of flow is about ten times the delivery rate of flow, of the mixture to the esterification installation, inasmuch as the agitator 12, 12' has, more than all, the task of preserving the homogeneousness of the mixture when the latter stays in the vessel 10, the mixture itself being continuously recycled.

A few practical examples of the invention will now be described, with regard to their essential elements, reference being had to the plot of FIG. 2. This latter reports curves, obtained with a fair approximation and with only slight interpolations, on the basis of viscosity tests at different temperatures, as carried out on ethylene glycol alone and on ethylene glycol/terephthalic acid pastes, according to different mixing ratios. More accurately, the plot reports the curve $Vg$ of the viscosity of ethylene glycol, which should refer to the scale A, in which the viscosities are reported in centipoises (cp.), and three curves $Vm$ of the "apparent" viscosity of the mixture, relating to mixtures showing a terephthalic acid/ethylene glycol molar ratio of 1 to 1.4, and 1 to 1.8, and 1 to 2.2, respectively. These ratios are plotted in the graph so as to identify the respective curves. The $Vm$ curves indicate the "apparent viscosity" trend as a function of temperature (expressed in degrees centigrade on the abscissae, along a scale which is common to all the curves. The viscosity is indicated in poises (p.) on the second scale B of the ordinates.

The term "apparent viscosity" as reported above, with relation to the physical conditions of the doughy mixture, is justified by the fact that the viscosity values correspond to apparent measures, inasmuch as a non-newtonian fluid is in the question herein. The measures have been read on samples of mixtures according to several ratios, by using a Brookfield type viscometer, driven at a constant speed of 5 r.p.m. This method, which is admittedly empirical, for measuring the apparent viscosity or, better to define it, the consistency of doughy mixtures, is otherwise sufficient to give a clear picture of the variation of the physical condition of said mixtures as a function of the temperature, whereas their behavior with the lapse of time will be indicated hereinafter as a commentary to the three examples tabulated below.

| | Apparent viscosity, poises for example— | | |
|---|---|---|---|
| | No. 1 | No. 2 | No. 3 |
| TPA to glycol ratio | 1:2.2 | 1:1.8 | 1:1.4 |
| Temperature: | | | |
| 20° C | 160 | 364 | 600 |
| 35° C | | 200 | |
| 40° C | | | 240 |
| 50° C | 104 | 120 | |
| 60° C | | | 240 |
| 70° C | 88 | [1] 200–240 | |
| 80° C | | | [2] 240 |
| 90° C | [3] 240 | | |

[1] As the temperature approaches 70° C., the paste is almost dry and TPA has seemingly absorbed all the glycol. The behavior as time goes is irregular: from an apparent initial viscosity of 200–240 poises, the value drops to 180 poises after 15 mins. approx. and then it does gradually rise, after 90 to 120 mins. to (apparent) values over 800 poises.

[2] After an apparent stabilization starting from 40° C., the paste rapidly hardens at temperatures in the neighbourhood of 60° C. until stopping the viscometer, that which suggests an apparent viscosity of more than 1,600 poises. The paste is extremely compact and, especially at lower temperatures, the points of the viscometer form hollows in the paste and these are then closed with difficulty.

[3] The gradual decrease of apparent viscosity, up to 70° C. approximately, is abruptly stopped and, at 90° C. the viscosity, which is already high, is increased with time and after 90 mins. it exceeds 800 poises (apparent value). Differently from pastes having a higher concentration (Examples 2 and 3), the increase of apparent viscosity, in time, seems to be caused by sedimentation phenomena, rather than by swelling.

In general phenomena of an apparently thixotropic nature are experienced, with a decrease of the apparent viscosity in time, the latter being returned to the intial values when stirring is discontinued.

The different scales A and B in the plot of FIG. 2 have been selected so as to permit a direct visual comparison between the trends of the viscosity curves, both actual and apparent, of the liquid phase (glycol) and of the mixture. Especially in the field of the higher concentrations, it is clearly observed that the apparent viscosity is decreased concurrently with the decrease of the viscosity of the liquid as the temperature is increased, but such a decrease is virtually stopped as 40° C. are exceeded and, in the 50° C. field, a sharp inversion is experienced, which is followed by the occurrence of phenomena of alteration of the consistency and the physical conditions of the mixture, thus definitely confirming the advantage of maintaining the mixture at comparatively low temperatures, but not exceedingly low, however. The values between 30° C. and 40° C. are, in practice, those in which there is the most favourable combination among apparent viscosity, homogeneousness, flowability and, above all, regularity of feed and metering for the mixture to a constant and uniform concentration everywhere.

A device such as shown in FIG. 1 has been advantageously and satisfactorily used for the preparation of mixtures, maintained at temperatures comprised between 20° C. and 30° C., at high and even very high concentrations. The following example is illustrative of a typical embodiment of the invention.

Example 4

A mixer 10, having a capacity of 160 liters and equipped with a gate type agitator 12 driven at 100 r.p.m. by a 3.5 H.P. motor 14, associated to a recycling pump 28 driven by a 0.75 H.P. motor and having a rate of flow of 600 liters an hour has been used. Upon initially charging the appropriate amounts of ethylene glycol and terephthalic acid, mixing is carried out during one hour approximately, whereupon the continuous feed of the acid by means of a conveying screw, the acid being crystallized but not ground, since, in practice, an actual grinding of the acid is experienced due to the action of the mechanical means of the mixer: the glycol is fed by means of a gear pump and the paste is continuously withdrawn by the gear pumps 42 and 44.

Several conditions in which the installation has satisfactorily worked, by ensuring a well metered feed of a paste having a good homogeneousness are tabulated below:

| | | | |
|---|---|---|---|
| TPA/glycol molar ratio | 1:2 | 1:1.5 | 1:1.1 |
| Initial TPA charge, kgs | 55 | 55 | 55 |
| Initial glycol charge, kgs | 41.3 | 31 | 22.8 |
| Run: | | | |
| TPA feed (kgs./hour) | 20 | 20 | 20 |
| Glycol feed (kgs./hour) | 15 | 12.25 | 8.25 |
| Metered withdrawal of paste (kgs./hour) | 35 | 32.25 | 28.25 |
| Temperature around mixer 10 in ° C | 21 | 25 | 30 |
| Temperature of paste as issuing from the pumps, at 50 in ° C | 23 | 28 | 34 |

During the continuous and regular run of the device, the power actually applied to the agitator and to the recycling pump totalled, in the above indicated conditions, up to 1150 watts and respectively to 1400 watts and to 1820 watts.

The internal temperature aforementioned has been ensured by circulation of water at 15° C. through the jacket 16 of the mixer 10, in such amount for subtracting all the heat promoted by the intensive mixing and recycling actions.

On the other hand, similar results have been obtained by removing heat with the aid of a heat-exchanger operating along the recycling circuitry 30–34.

What is claimed:

1. In a method for preparing a homogeneous paste, that can be fed in a measurable manner, for use in the production of a polyester, in which a phthalic acid is mixed in solid, finely subdivided form with a liquid glycol so that the glycol/phthalic acid ratio in the paste is no greater than 2.2 to 1, the improvement comprising maintaining the acid and the glycol and the paste at a temperature between 50° C. and 10° C. until the paste is fed on for producing the polyester.

2. A method according to claim 1, in which the acid is terephthalic acid and the glycol is ethylene glycol.

3. A method according to claim 2, in which the ethylene glycol to terephthalic acid molar ratio does not exceed 2 to 1.

4. A method according to claim 1, wherein the temperature is maintained between 35° C. and 20° C. during the homogenization of the paste.

5. A method according to claim 2, in which the paste is formed with an ethylene glycol to terephthalic acid molar ratio between 2.2 to 1 and 1.1 to 1.

6. A method according to claim 1 in which the homogenization is performed by mechanically mixing the glycol and acid for at least two hours at a temperature between 50° and 10° C.

7. A method according to claim 6 in which heat is continuously subtracted from the homogenization environment to dissipate completely heat produced by the mechanical mixing.

8. A method according to claim 1, wherein homogenization of the mixture is effected with mechanical pumping treatment of the reactants through a recycling circuit including a stay vessel equipped with mechanical means for the retention in the homogeneous state of the mixture recycled to said vessel.

9. A method according to claim 8, wherein the mixture is recycled at a rate at least ten times greater than the rate of delivery of the mixture for esterification.

10. A method according to claim 8, wherein the mixture is cooled in order to dissipate the heat generated by the mixing, pumping, and recycling actions, the heat being removed through the walls of a component part of the recycling circuitry.

References Cited

UNITED STATES PATENTS 3,644,294  2/1972  Siclari et al. _____ 260—75 M

JOHN D. WELSH, Primary Examiner

U.S. Cl. X.R.

260—75 M

UNITED STATES PATENT OFFICE
CERTIFICATE OF CORRECTION

Patent No. 3,781,213    Dated Dec. 25, 1973

Inventor(s) Francesco Siclari, Franco Magnoni, and Battista Morandi

It is certified that error appears in the above-identified patent and that said Letters Patent are hereby corrected as shown below:

The name of the assignee is corrected to read:

SNIA VISCOSA SOCIETA NAZIONALE INDUSTRIA APPLICAZIONI VISCOSA S.p.A.

Signed and sealed this 14th day of May 1974.

(SEAL)
Attest:

EDWARD M. FLETCHER, JR.
Attesting Officer

C. MARSHALL DANN
Commissioner of Patents